US006201175B1

(12) United States Patent
Kikumoto et al.

(10) Patent No.: US 6,201,175 B1
(45) Date of Patent: Mar. 13, 2001

(54) WAVEFORM REPRODUCTION APPARATUS

(75) Inventors: Tadao Kikumoto, Shizuoka; Atsushi Hoshiai, Hannan; Satoshi Kusakabe, Hamamatsu, all of (JP)

(73) Assignee: Roland Corporation, Osaka (JP)

( * ) Notice: Subject to any disclaimer, the term of this patent is extended or adjusted under 35 U.S.C. 154(b) by 0 days.

(21) Appl. No.: 09/511,009

(22) Filed: Feb. 22, 2000

(30) Foreign Application Priority Data

Sep. 8, 1999 (JP) ........................................ 11-254569

(51) Int. Cl.[7] ........................ G06F 17/15; G10H 7/04

(52) U.S. Cl. ........................ 84/605; 708/203; 708/420

(58) Field of Search ........................ 84/605; 708/203, 708/315, 420, 421

(56) References Cited

U.S. PATENT DOCUMENTS 3,946,504 3/1976 Nakano ........................ 35/35
4,805,217 2/1989 Morihiro et al. ........................ 381/35
4,876,937 10/1989 Suzuki .
5,315,057 5/1994 Land et al. ........................ 84/601
5,347,478 9/1994 Suzuki et al. ........................ 364/715.02
5,412,152 5/1995 Kageyama .
5,471,009 11/1995 Oba et al. ........................ 84/645
5,499,316 3/1996 Sudoh et al. ........................ 395/2.79
5,511,000 4/1996 Kaloi et al. ........................ 364/514
5,611,018 3/1997 Tanaka et al. ........................ 395/2.24
5,675,709 10/1997 Chiba ........................ 395/2.87
5,713,021 1/1998 Kondo et al. ........................ 395/614
5,717,818 2/1998 Nejime et al. ........................ 395/2.2
5,734,119 3/1998 France et al. ........................ 84/622
5,745,650 4/1998 Otsuka et al. .
5,763,800 6/1998 Rossum et al. ........................ 84/603
5,765,129 6/1998 Hyman et al. ........................ 704/270
5,774,863 6/1998 Okano et al. ........................ 704/278
5,781,696 7/1998 Oh et al. ........................ 395/2.79
5,792,971 8/1998 Timis et al. .
5,809,454 9/1998 Okada et al. ........................ 704/214
5,847,303 12/1998 Matsumoto ........................ 84/610
5,873,059 2/1999 Iijima et al. ........................ 704/207

*Primary Examiner*—Stanley J. Witkowski
(74) *Attorney, Agent, or Firm*—Foley & Lardner

(57) ABSTRACT

A method for generating a compressed or expanded waveform from original waveform data is disclosed. A plurality of frequency band-divided waveform data is generated from the original waveform data. Phase and amplitude data having periodically changing amplitudes are extracted for each of the plurality of frequency band-divided waveform data. The periodically changing phase data is converted to periodically changing frequency data, and a temporal change rate of the periodically changing amplitude and frequency data is adjusted for each of the plurality of frequency band-divided waveform data. The temporally adjusted amplitude and frequency data for the plurality of frequency band-divided waveform data is then combined to generate the compressed or expanded waveform.

19 Claims, 12 Drawing Sheets

WAVEFORM REPRODUCTION APPARATUS

CROSS-REFERENCE TO RELATED APPLICATIONS

Embodiments of the present invention relate to and claim priority to Japanese Patent Application No. 11-254569, filed on Sep. 8, 1999, and the contents of that application are incorporated by reference herein.

BACKGROUND OF THE INVENTION

1. Field of the Invention

The present invention relates to a waveform reproduction apparatus with which a waveform that has been compressed or expanded in the direction of the temporal axis is reproduced.

2. Description of the Related Art

For some time, waveform reproduction apparatuses with which a waveform that has been compressed or expanded in the direction of the temporal axis is reproduced have been known. For these waveform reproduction apparatuses, a number of formats have been proposed. Here an explanation will be given first regarding a waveform reproduction apparatus that uses a cross-fade format.

FIG. 12 is an explanatory diagram of a cross-fade format in which a musical tone is compressed or expanded in the direction of the temporal axis.

In the waveform reproduction apparatus that uses the cross-fade format, the waveform data that express the waveform of the musical tone are stored in a RAM that is not shown in the diagram. The waveform data that have been stored in the RAM are read out and, as is shown in FIG. 12(*a*), the waveform data in a specified segment (known as the "opened segment") are jump read and the waveform is compressed or, as is shown in FIG. 12(*b*), the waveform data in a specified segment (known as the "repeated segment") are repeated and read out and the waveform is expanded. By means of carrying out this action, it is possible to restrain the changes in the pitch with a waveform that has been compressed or expanded and to preserve the pitch of the musical tone. In addition, with the cross-fade format, since noise that is generated in the vicinity of the discontinuous areas of the links between a particular segment and the segments that adjoin that segment is suppressed, it is possible to carry out cross-fade processing in the vicinity of the discontinuous areas.

Here, the meaning of cross-fade processing is processing in which, by means of gradually increasing the amplitude of a waveform that has begun to be read out anew (this is made the later waveform) together with the gradual reduction of the amplitude of the waveform that has been read out up to that point (this is made the head waveform), a transition is made smoothly from the head waveform to the later waveform.

However, with this cross-fade format, since the waveforms that represent musical tone waveforms that are continuous are jump read out or repetitively read out directly, even though cross-fade processing is carried out, there is a problem in that fluctuations or ripples are produced in the waveform that has been compressed or expanded due to such things as a shift in the phase.

In order to solve this problem, a waveform reproduction apparatus called a phase vocoder has been presented. Below, an explanation will be given in regular sequence regarding this phase vocoder.

With the phase vocoder, the original waveform, which expresses the original musical tone prior to carrying out compression or expansion is input. The phase vocoder divides the original waveform that has been input into a multiple number of frequency bands.

FIG. 13 is a diagram that shows the multiple number of frequency bands that have been divided by a phase vocoder.

The original waveform that has been input is divided into a multiple number (here, there are 100) of frequency bands (band 0, 1, . . . k, . . . , p, . . . , 99) which have the center frequencies ω0, ω1, . . . , ωk, . . . , ωp, . . . , ω99 that are respectively the integer multiple frequencies that represent the fundamental frequency and the harmonics of the fundamental frequency including the second harmonic, third harmonic etc. In addition, this phase vocoder, for each waveform component of the respective multiple number of frequency bands that have been divided, extracts the frequency data and the amplitude data of each of the waveform components that represent the frequencies that change in order together with the passage of time (known as the instantaneous frequency) and the amplitudes that change in order together with the passage of time. The frequency data and the amplitude data that have been extracted in this manner are stored in the memory.

At the time of the reproduction of the waveform, the temporal change rates are adjusted for the frequencies and amplitudes that are expressed by the frequency data and the amplitude data that have been extracted in each frequency band.

FIG. 14 is a schematic diagram that shows the aspects of the frequency and amplitude temporal change rates that have been adjusted by the phase vocoder.

In FIG. 14(*a*), the amplitude envelope and the frequency envelope that are expressed by the amplitude data and the frequency data that change together with the passage of time in a certain single frequency band are shown. As is shown in FIG. 14(*b*), the amplitude data and the frequency data are corrected by the adjustment of the temporal change rate for the frequency and the amplitude in accordance with the degree to which expansion or compression are carried out and the envelope is expanded or, as is shown in FIG. 14(*c*), the amplitude data and the frequency data are culled out and the compression of the envelopes is carried out. By doing it in this manner, after the amplitude envelopes and the frequency envelopes have been adjusted for each frequency band, the cosine waves that have been finely adjusted by an oscillator with which the fine adjustment of the frequency is possible in accordance with the frequency envelope for the center frequency of each of the frequency bands together with the passage of time are obtained. The amplitudes of the cosine waves are finely adjusted in accordance with the amplitude envelopes together with the passage of time and, in addition, in this phase vocoder, all of these waveforms that have been reproduced are combined. In this manner, a reproduced waveform in which the original waveform that has been input has been compressed or expanded in the direction of the temporal axis is obtained.

Since the phase vocoder that has been discussed above is one in which the original waveform is divided into a multiple number of frequency bands, the temporal change rates of the frequencies and the amplitudes that change together with the passage of time are adjusted for each of multiple number of frequency bands that have been divided and, by means of the reproduction of the time conversions for the frequencies and the amplitudes following adjustment, a reproduced waveform in which the original waveform has been compressed or expanded in the direction of the temporal axis is obtained, compared to the case, as in the waveform reproduction apparatus that uses the cross-fade format, in which the waveform data that express the original waveform are themselves directly jump read out or repetitively read out, noise and fluctuations due to such things as a shift in the phase are reduced.

However, in this phase vocoder, with such things as voices and brass where the period of the waveform is long or the waveforms of chords, if the expansion and compression rate, which represents the proportion of compression or expansion, is varied greatly from 1.0 for both compression and expansion, there is a breakdown of the harmonic relationships of the musical tones that are expressed by the waveforms that have been compressed or expanded in the direction of the temporal axis. A detailed explanation of this phenomenon will be given below.

In the case of the phase vocoder discussed above, in order to provide a theoretical description, it was explained to the effect that the original waveform that has been input is, as is shown in FIG. 12, divided into a frequency band that contains the fundamental frequency, a frequency band that contains only a frequency that is twice the fundamental frequency etc. and frequency bands that contain one each only from among the multiple number of frequency components that comprise the original waveform in a single frequency band. However, in the case of this kind of method of division, the requirement is produced for a division into an extremely large number of frequency bands, an extremely large circuit becomes necessary or the time needed for the operations becomes extremely long and it is not pragmatic. Therefore, here, the division of the frequency bands such that a multiple number of frequency components that comprise the original waveform are contained in a single frequency band is considered.

FIG. 15 is a diagram that shows a multiple number of frequency bands and FIG. 16 is a diagram that shows the shape of the pulse stream form original waveform prior to the division into the multiple number of frequency bands that are shown in FIG. 15. In addition, FIG. 17 is a diagram that shows the waveform in a single frequency band from among the multiple number of frequency bands that are shown in FIG. 15.

Here, as is shown in FIG. 16, the original waveform that is input into the phase vocoder comprises a periodic pulse stream that has a comparatively long period. The number of band divisions that are shown in FIG. 15 is smaller than the number of band division that are shown in FIG. 13 and, consequently, the bandwidths for each individual frequency band are wide. Because of this, as is shown in FIG. 15, in, for example, band k, which is one divided band, a multiple number of frequencies which are integer multiples of the fundamental frequency that corresponds to the fundamental period exist that represent a multiple number of adjoining harmonics. The waveform in this band k is the waveform that is shown by the solid line in FIG. 17 and, as is shown by the broken like that represents the envelope, is a waveform that is amplitude modulated at the fundamental period T.

FIG. 18 and FIG. 19 are diagrams that show the aspects of the waveform components in band k that is shown in FIG. 17 in which the temporal change rates are adjusted so that the amplitude and the frequency change slowly. In addition, FIG. 20 is a diagram that shows the waveforms in band k after the temporal change rates of the amplitude and the frequency have been adjusted so that they are slow.

The broken lines a and b that are shown in FIG. 18 and FIG. 19 are the envelopes prior to the adjustment of the temporal change rates of the amplitude and the frequency in band k. In adjusting the temporal change rates of the amplitude and the frequency in band k so they are slow, the amplitude data and the frequency data of each envelope that is shown by the broken lines a and b at each sampling point are interpolated uniformly in the direction of the temporal axis and are expanded as is shown by the solid lines A and B. In this manner, the waveform that is shown in FIG. 20 in which the temporal change rates of the amplitude and the frequency of band k are adjusted so that they are slow is obtained. Here, the fundamental period T' of the waveform that is shown in FIG. 20 is longer than the fundamental period of the waveform T that is shown in FIG. 17. When these kinds of waveforms are reproduced for each band and combined and a waveform that has been expanded in the direction of the temporal axis is obtained, there is a problem in that the harmonic relationships of the original waveform are lost and the sound quality of the musical tone is lowered. In order to avoid that, it is necessary that the original waveform that is input, as is shown in FIG. 13, be divided into many frequency bands in which the fundamental frequency and the frequencies that are integer multiples of the fundamental frequency are the center frequencies. However, when they are divided into a large number of frequency bands in this manner, as was discussed before, the amount of processing in the phase vocoder swells, the processing time becomes longer together with an increase in the size of the circuit and, consequently, as a practical matter, the realization of the system becomes difficult.

In addition, with the phase vocoder of the past that has been described above, the reproduction of the original sound (hereafter, referred to as "one-to-one reproduction") is carried out again and again. In that case, the temporal change rate of the frequency and the amplitude and the pitch data are adjusted so that neither compression nor expansion in the direction of the temporal axis is carried out for each of the multiple number of frequency bands of the original waveform that have been divided and one-to-one reproduction can be carried out. However, the phase data are not taken into consideration. Because of this, with one-to-one reproduction, waveforms are reproduced that have phases that are different from the phase of the waveform that expresses the original sound and, consequently, there are problems such as the fact that the tone quality is degraded and the orientation of the stereo signal is lost.

SUMMARY OF THE INVENTION

The present invention, taking the above mentioned conditions into consideration, has as its object the presentation of a waveform reproduction apparatus with which a waveform that has been compressed or expanded in the direction of the temporal axis can be obtained that expresses such things as musical tones the sound quality of which is high.

The first waveform reproduction apparatus from among the waveform reproduction apparatuses of the present invention that achieves the above mentioned object is characterized in that it comprises a storage means in which, for each waveform component at the time that an original waveform is divided into each waveform component of a multiple number of frequency bands, the phase data and the amplitude data that respectively express the phases and amplitudes of each waveform component that change in order together with the passage time are stored and a frequency data conversion means in which the above mentioned phase data are converted into frequency data and a change rate adjustment means in which the temporal change rates of the frequency and the amplitude that are expressed by the above mentioned phase data and amplitude data are adjusted and a waveform reproduction means in which a waveform in which the original waveform has been compressed or expanded in the direction of the temporal axis is obtained by the reproduction of a waveform in which the time conversions of the frequency and the amplitude following the adjustments of the temporal change rate are reproduced.

With the first waveform reproduction apparatus of the present invention, since the phase data and the amplitude data for each waveform component of the original waveform are stored in advance and a waveform is obtained in which the original waveform has been compressed or expanded in the direction of the temporal axis by adjusting the temporal change rate of the frequency and the amplitude that are expressed by the phase data and amplitude data that have been stored and reproducing the waveform, even in a case where one-to-one reproduction is carried out in order to reproduce the original sound, for each of the multiple number of frequency bands of the original waveform that have been divided, the temporal change rates of the frequency and the amplitude that are expressed by the phase data and the amplitude data are adjusted so that neither compression nor expansion are carried out in the direction of the temporal axis. Accordingly, compared to the technology with which a waveform is reproduced that has a phase that is different from the phase of the waveform that expresses the original sound, there are no problems such as a degradation of the tone quality or a loss of the orientation of the stereo signal and it is possible to obtain a waveform that has been compressed or expanded in the direction of the temporal axis which expresses such things as musical tones the sound quality of which is high.

Here, it is effective if the above mentioned change rate adjustment means is one, with regard to the amplitude, in which, by means of an operation in which the amplitude data for the amount of one integer period or more of the periodic change of the amplitude that is expressed by the amplitude data are duplicated and added or omitted, the temporal change rate of the amplitude is adjusted so that it is longer than that period while maintaining the period of the periodic change of the amplitude.

When, in this manner, while maintaining the period of the periodic change of the amplitude, the time conversion of the amplitude is adjusted so that it is longer than that period, even in those cases where, in a certain frequency band, a multiple number of harmonics that are adjacent exist in multiple numbers, without compressing or expanding the fundamental frequency of the waveform components that are in the frequency band, it is possible to prevent the breakdown of the harmonic relationships of the original waveform and to raise the sound quality of the musical tones etc.

In addition, it is preferable that the above mentioned change rate adjustment means be one in which, together with the adjustment of the temporal change rate for the amplitude by the repetition of the above mentioned operations related to the amplitude data, with regard to the frequency that is expressed by the phase data also, the temporal change rate for the frequency is adjusted by repeating an operation in which the phase data that correspond to the amplitude data that are duplicated and added or omitted or the frequency data into which that phase data have been transformed are repeated and added or omitted.

When, in this manner, with regard to the frequency that is expressed by the phase data also, the operation in which the phase data that correspond to the amplitude data that are duplicated and added or omitted or the frequency data into which that phase data have been transformed are duplicated and added or omitted, it is possible to adjust the temporal change rate of the frequency with good accuracy.

In addition, the second waveform reproduction apparatus from among the waveform reproduction apparatuses of the present invention that achieves the above mentioned object is characterized in that it comprises a storage means in which, for each waveform component at the time that an original waveform is divided into each waveform component of a multiple number of frequency bands, the frequency data and the amplitude data that respectively express the frequencies and amplitudes of each waveform component that change in order together with the passage time are stored. The second waveform reproduction apparatus also comprises a change rate adjustment means in which the temporal change rates of the frequency and the amplitude that are expressed by the above mentioned frequency data and amplitude data are adjusted. In addition, the second waveform reproduction apparatus comprises a waveform reproduction means in which a waveform in which the original waveform has been compressed or expanded in the direction of the temporal axis is obtained by the reproduction of a waveform in which the time conversions of the frequency and the amplitude following the adjustments of the temporal change rate are reproduced.

The above mentioned change rate adjustment means is one, with regard to the amplitude, in which, by means of an operation in which the amplitude data for the amount of one integer period or more of the periodic change of the amplitude that is expressed by the amplitude data are duplicated and added or omitted, the temporal change rate of the amplitude is adjusted so that it is longer than that period while maintaining the period of the periodic change of the amplitude.

Since, with the second waveform reproduction apparatus of the present invention, the period of the periodic change of the amplitude is maintained and the temporal change rate of the amplitude is adjusted so that the period is longer than that period, even in those cases where, in a certain frequency band, a multiple number of harmonics that are adjacent exist in multiple numbers, without compressing or expanding the fundamental frequency of the waveform components that are in the frequency band, it is possible to prevent the breakdown of the harmonic relationships of the original waveform and to raise the sound quality of the musical tones etc.

Here, it is preferable that the above mentioned change rate adjustment means be one in which, together with the adjustment of the temporal change rate for the amplitude by the repetition of the above mentioned operations related to the amplitude data, with regard to the frequency also, the temporal change rate for the frequency is adjusted by repeating an operation in which the frequency data that correspond to the amplitude data that are duplicated and added or omitted are repeated and added or omitted.

When, in this manner, with regard to the frequency also, the operation in which the frequency data that correspond to the amplitude data that are duplicated and added or omitted are duplicated and added or omitted, it is possible to adjust the temporal change rate of the frequency with good accuracy.

As has been explained above, in accordance with the present invention, it is possible to obtain a waveform that expresses musical tones etc. that have a high sound quality which have been compressed or expanded in the direction of the temporal axis.

DETAILED DESCRIPTION OF PREFERRED EMBODIMENTS

Below, an explanation will be given regarding preferred embodiments of the present invention.

Figure 1:
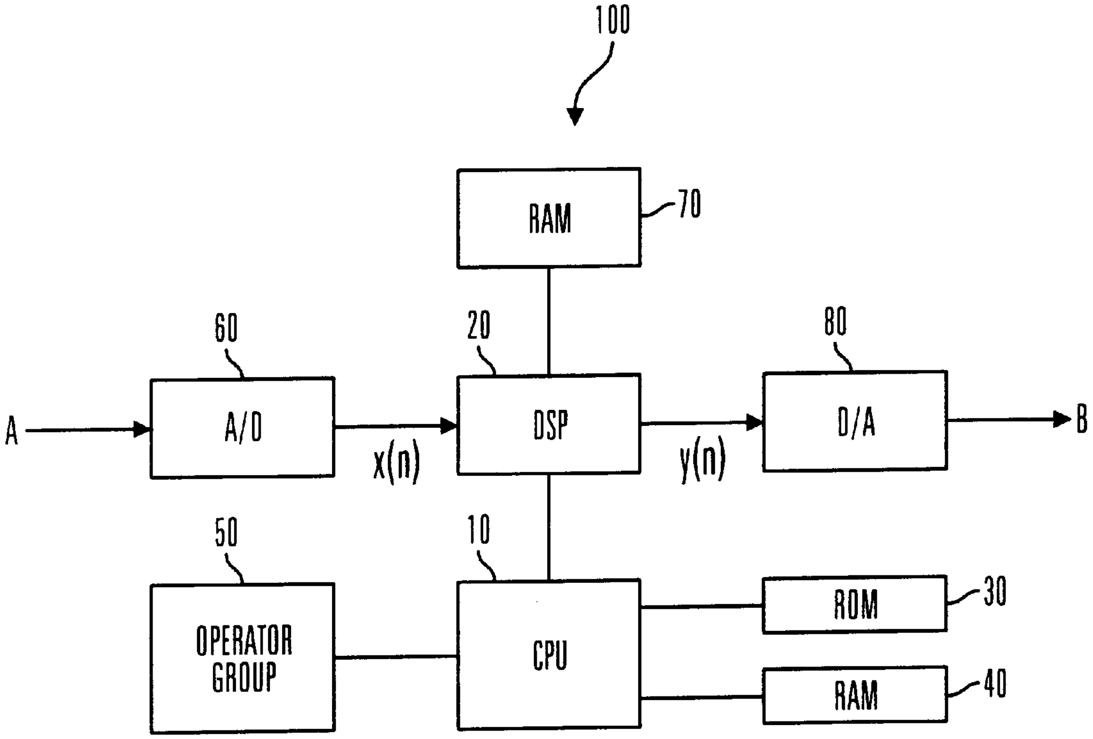
FIG. 1 is a block diagram that shows the circuit configuration of the waveform reproduction apparatus of the first preferred embodiment of the present invention.

FIG. 1 is a block diagram that shows the circuit configuration of the waveform reproduction apparatus of the first preferred embodiment of the present invention.

The waveform reproduction apparatus 100 comprises the CPU 10 and the digital signal processor (DSP) 20. The DSP 20 is controlled by the CPU 10 and, as will be discussed later, forms a waveform that has been compressed or expanded.

In addition, the waveform reproduction apparatus 100 comprises the ROM 30, the first RAM 40 and the operator group 50. The programs to carry out the operation of the CPU 10 and the DSP 20 are stored in the ROM 30 and the program for the DSP 20 is transmitted to the DSP 20 via the CPU 10. The first RAM 40 is used as the working memory for the CPU 10. The operator group 50 comprises the expansion and compression rate switch for setting the expansion and compression rate and the reproduction switch for the combination and reproduction of each of the waveforms that have been formed based on the expansion and compression rates that have been set.

In addition, the waveform reproduction apparatus 100 comprises the A/D converter 60, the second RAM 70 and the D/A converter 80. The A/D converter 60 converts the analog signal A that has been input into a digital one, forms the digital original waveform x(n) and inputs it to the DSP 20. Such things as the phase data and the amplitude data that have been produced by the DSP 20, as will be discussed later, are stored in the second RAM 70. The D/A converter 80 converts the compressed or expanded waveform y(n) that has been output by the DSP 20 into an analog one and outputs the analog signal B.

Figure 2:
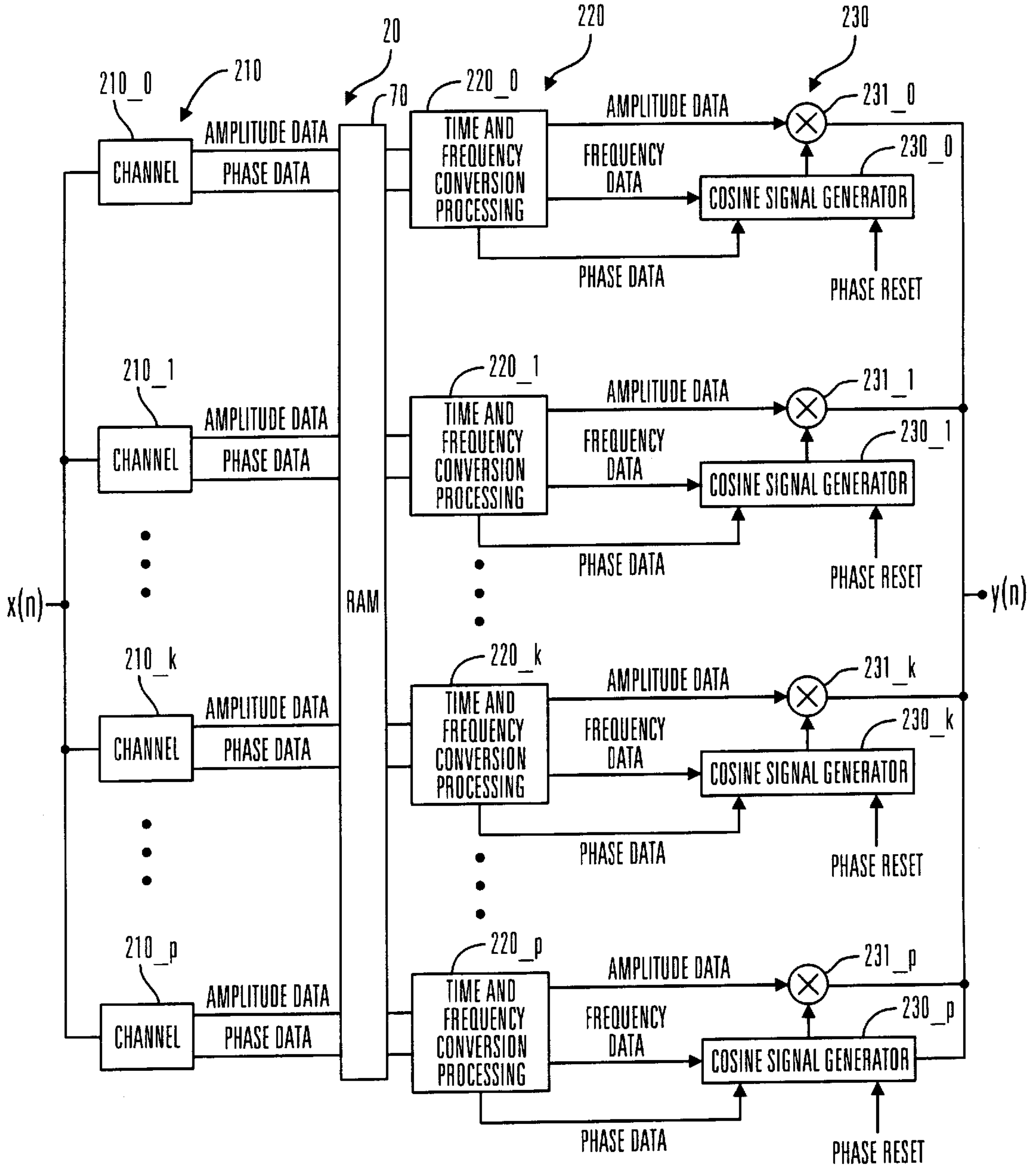
FIG. 2 is a block diagram in which the functions of the RAM and the DSP that are shown in FIG. 2 have been shown as functional blocks and in which the blocks are shown classified by function.

FIG. 2 is a block diagram in which the functions of the RAM and the DSP that are shown in FIG. 2 have been shown as functional blocks and in which the blocks are shown classified by function.

Figure 15:
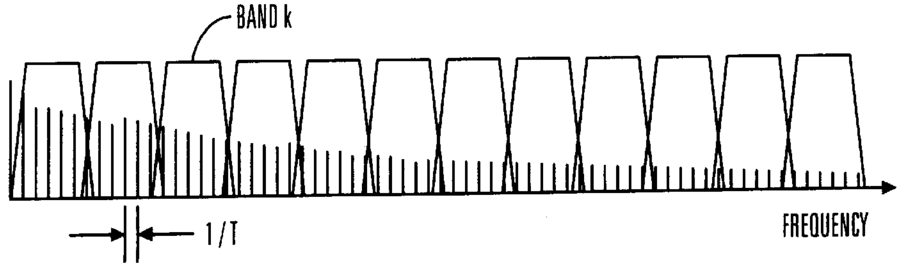
FIG. 15 is a diagram that shows a multiple number of frequency bands.
Figure 16:
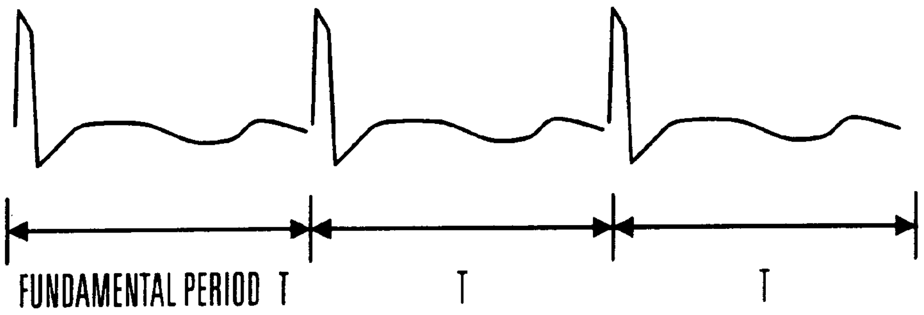
FIG. 16 is a diagram that shows a pulse stream form original waveform prior to division into the multiple number of frequency bands that are shown in FIG. 12.
Figure 17:
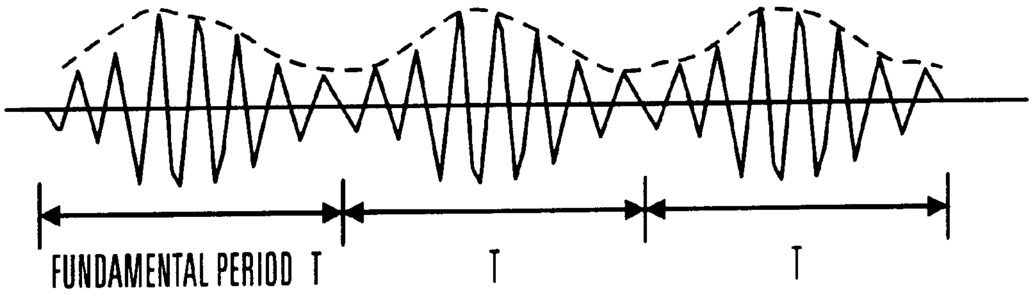
FIG. 17 is a diagram that shows one frequency band from among the multiple number of frequency bands that are shown in FIG. 15.
Figure 18:
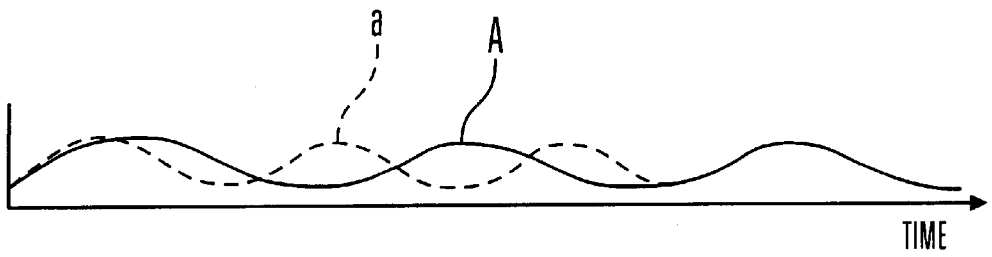
FIG. 18 is a diagram that shows the aspect of the adjustment of the temporal change rate so that the amplitude of the waveform component in band k that is shown in FIG. 17 changes slowly.
Figure 19:
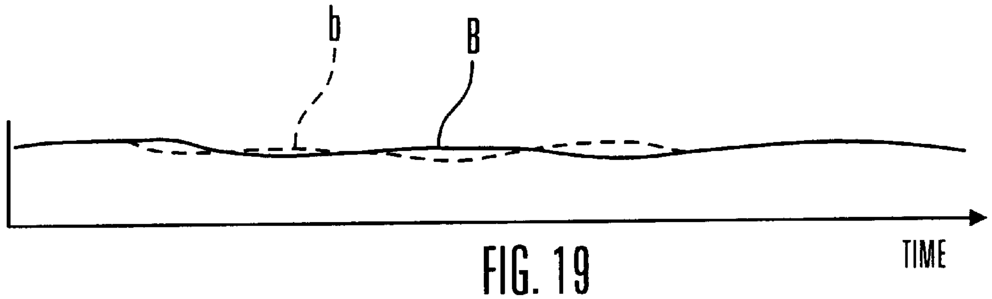
FIG. 19 is a diagram that shows the aspect of the adjustment of the temporal change rate so that the frequency of the waveform component in band k that is shown in FIG. 17 changes slowly.
Figure 20:
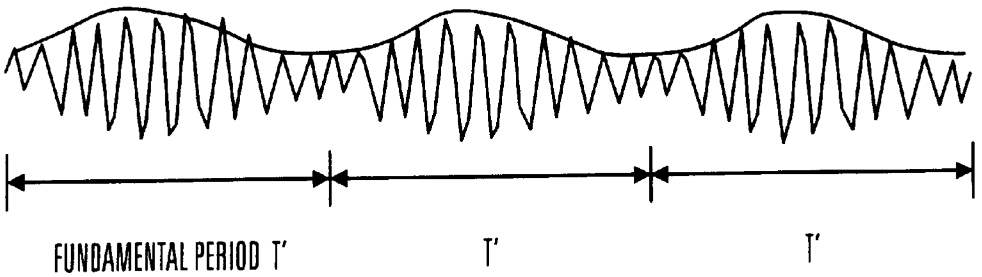
FIG. 20 is a diagram that shows the waveform after the temporal change rates of the amplitude and frequency in band k have been adjusted so that they are slow.

The DSP 20 that is shown in FIG. 2 comprises the analysis section 210, the conversion section 220 and the combining section 230. The expansion and compression switch (not shown in the figure) that is comprised by the operator group 50 of the waveform reproduction apparatus 100 that is shown in FIG. 1 is operated and the desired rate of expansion or compression is set. Then the reproduction switch, which is not shown in the figure, is pressed directing the waveform reproduction and the original waveform x(n) that expresses the original musical tone prior to carrying out compression or expansion is input to the analysis section 210 that is comprised by the waveform reproduction apparatus 100. Here, n is a number that has been appended to each piece of data that expresses the instantaneous value of the original waveform which are input in order in time sequence. The analysis section 210 comprises the channels 210_0, 210_1, . . . , 210_k, . . . , 210_p. In the analysis section 210, the original waveform x(n) that has been input, as is shown in FIG. 15 that was discussed previously, is divided into a multiple number of frequency bands (band 0, 1, . . . , k, . . . , p) so that, in each band, the frequencies that express the multiple number of harmonics that are adjacent and are integer multiples of the fundamental frequency exist in multiple numbers. For each of the waveform components of the multiple number of frequency bands that have been divided, the phase data and amplitude data that express the respective phases and amplitudes that have changed in order together with the passage of time are extracted and output to the RAM 70. A detailed explanation will be given below regarding the particulars of the analysis section 210 referring to FIG. 3.

Figure 3:
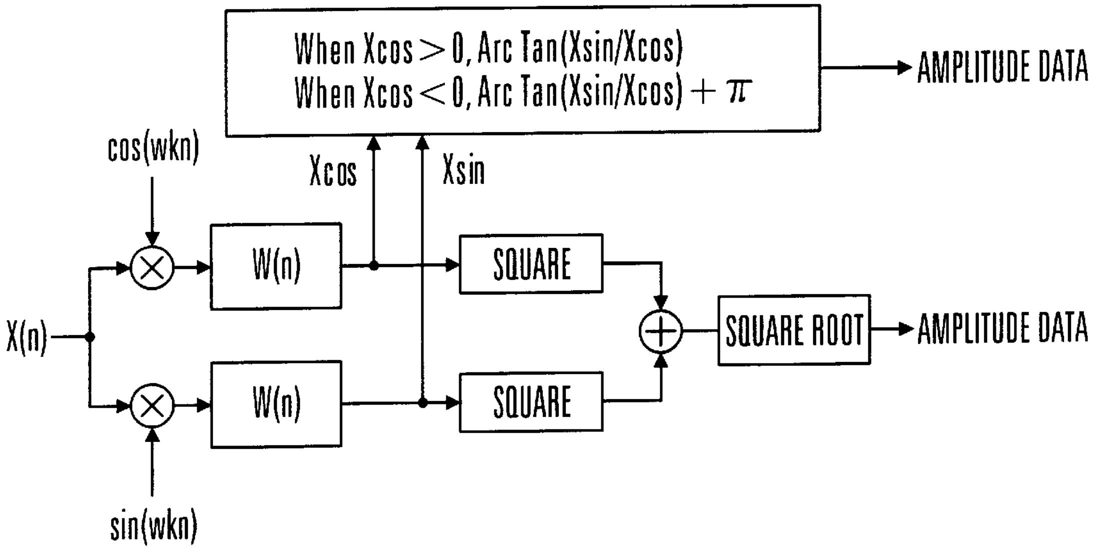
FIG. 3 is a diagram that shows the waveform processing in the first channel that comprises the analysis section that is shown in FIG. 2.

FIG. 3 is a diagram that shows the waveform processing in the first channel that comprises the analysis section that is shown in FIG. 2.

In FIG. 3, the aspect of the waveform processing in channel 210_k, which represents the multiple number of channels, is shown. In this channel 210_k, the nth data item (cos(ωkn), sin(ωkn)) of the center frequency ωk for the frequency band (band k) that corresponds to that channel 210_k is multiplied with the original waveform x(n) that has been input and converted into a real number portion and an imaginary number portion. Next, it is opened or convolved by the analysis window w that has a temporal width that corresponds to the impulse response time of an equivalent analog low-pass filter. Then the calculation of arctan(x sin/x cos), when x cos >0, is carried out, the calculation of arctan(x sin/x cos)+π, when x cos<0, is carried out and, together with the extraction of the phase data, the amplitude data are extracted by deriving the square root of the sum of the squares. This kind of calculation is repeated while the n of the nth data item (cos(ωkn, sin(ωkn)) of the center frequency ωk and the analysis window w(n) advance in order, that is to say, as they advance in order temporally. In this manner, the phase data and amplitude data that express the respective phases and amplitudes that have changed in order together with the passage of time are extracted for each of the channels 210_0, 210_1, . . . , 210_k, . . . , 201_p that are comprised by the analysis section 210. The phase data and the amplitude data that have been extracted are stored in the RAM 70 that is shown in FIG. 2.

The phase data and the amplitude data that have been stored in the RAM 70 are input to the conversion section 220. The conversion section, as is shown in FIG. 2, comprises the multiple number of time and frequency conversion processing means 220_0, 220_1, . . . , 220_k, . . . , 220_p. Each of the time and frequency conversion processing means 220_0, 220_1, . . . , 220_k . . . , 220_p converts the phase data into frequency data for each frequency band. In addition, each time and frequency conversion processing means 220_0, 220_1, . . . , 220 k, . . . , 220_p, for each frequency band, with regard to the amplitude, by means of a periodic operation in which the amplitude data for the amount of one integer period or more of the periodic change of the amplitude that is expressed by the amplitude data is duplicated and added or omitted, the temporal change rate of the amplitude is adjusted while maintaining the period of the periodic change of the amplitude.

Figure 4:
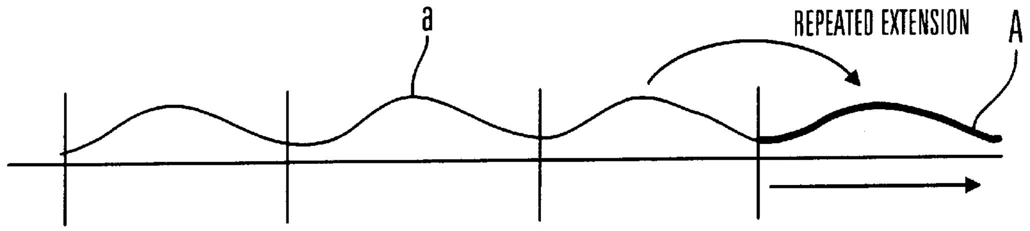
FIG. 4 is a diagram that shows the aspect of the adjustment of the temporal change rate by the time and frequency conversion processing means 220_k that is comprised by the change section 220 so that the amplitude in band k changes slowly.

Thus, for each frequency band, the amplitude data is examined to see if there is any cyclic amplitude modulation present. Such an amplitude modulation is shown in FIG. 4. If such a modulation is present, then the duration of the modulation cycle, indicated by the duration between vertical lines in FIG. 4, is used as the period of duplication and addition or omission of phase and amplitude envelope data to effect time expansion or compression. If no such modulation is present, then a convenient duplication period is used to effect the time compression or expansion.

In addition, with regard to the frequency that is expressed by the phase data also, the temporal change rate of the frequency is adjusted by means of repeating an operation in which the phase data that correspond to the amplitude data that are duplicated and added or omitted or the frequency data into which that phase data have been transformed are duplicated and added or omitted.

Figure 5:
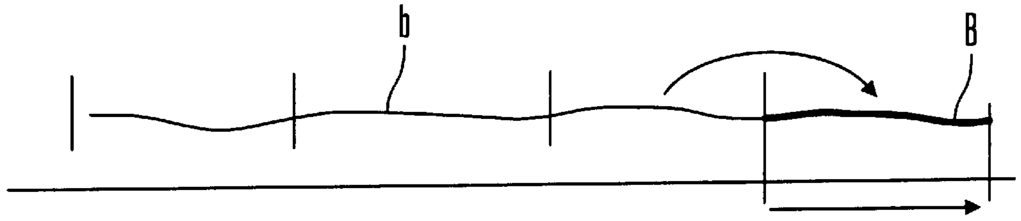
FIG. 5 is a diagram that shows the aspect of the adjustment of the temporal change rate by the time and frequency conversion processing means 220_k that is comprised by the change section 220 so that the frequency in band k changes slowly.

FIG. 4 and FIG. 5 are diagrams that show the aspect of the adjustment of the temporal change rate by the time and frequency conversion processing means 220_k that is comprised by the change section 220 so that the amplitude and frequency respectively in band k change slowly.

The thin lines a and b that are shown in FIG. 4 and FIG. 5 are, respectively the envelopes of the amplitude and the frequency that is expressed by the phase data in band k prior to the adjustment of the temporal change rates. Incidentally, FIG. 5 originally showed phase data but, for the purpose of making it easier to understand, it now shows the frequency data that are expressed by the phase data. To adjust the temporal change rate of the amplitude in band k so that it becomes slow, the amplitude data for the amount of one period of the periodic change of the amplitude that the amplitude data indicated by the thin line a expresses are duplicated and added as shown by the thick line a. In addition, with regard to the frequency that is expressed by the phase data, the frequency data into which the phase data that correspond to the amplitude data that have been duplicated and added are duplicated and added as shown by the thick line B. In this manner, together with the expansion of the amplitude envelope in band k, the frequency envelope is also expanded while maintaining the period of the periodic change of the amplitude. Incidentally, it is not limited to this and it may be done so that the amplitude data for the amount of two or more integer periods are duplicated and added or omitted and, with regard to the frequency also, together with the further expansion or compression of the amplitude envelope in band k, the frequency data that correspond to the amplitude data that are duplicated and added or omitted are duplicated and added or omitted and the frequency envelope in band k is further expanded or compressed.

Incidentally, in those cases where the pitch of the sound is changed, the frequency conversion processing that is shown below may be carried out by the time and frequency conversion processing means prior to the adjustment of the temporal change rate of the frequency.

Figure 6:
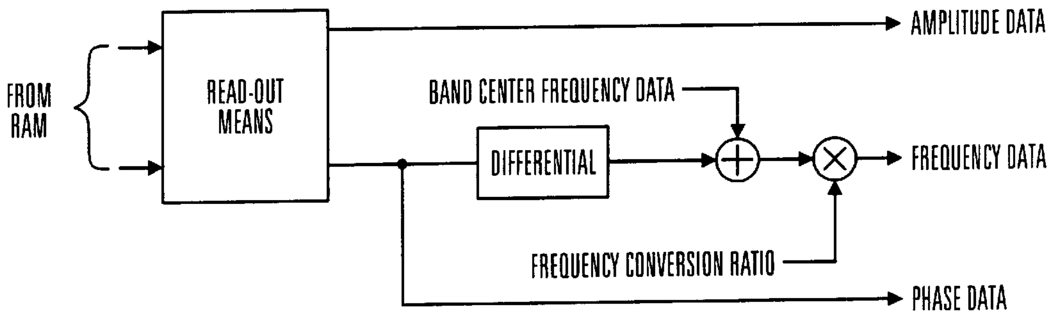
FIG. 6 is a diagram that shows the time and frequency conversion processing in order to change the sound pitch in the time and frequency conversion processing circuit.

FIG. 6 is a diagram that shows the time and frequency conversion processing in order to change the sound pitch in the time and frequency conversion processing circuit.

The time and frequency conversion processing means comprises a read-out means in which the amplitude data and the phase data are input from the RAM 70. As is shown in FIG. 4 and FIG. 5 that were discussed previously and in FIG. 7 that will be discussed later, an extension processing in which the adjustment of the time change rate is repeated is carried out by this read-out means. In order to carry out the frequency conversion processing to change the pitch of the sound, the phase data that have been output from the read-out means are differentiated by the time and frequency conversion processing means and the frequency data are extracted. Since these frequency data are data that only vary in the frequency band that corresponds to that time and frequency conversion processing means, the frequency are added to the center frequency data of the band by the time and frequency conversion processing means and the frequency data that include the data for the center frequency of the band are obtained. Then these are multiplied by the frequency conversion ratio that has been established in advance and new frequency data are obtained. By means of the adjustment of the temporal change rate of the frequency based on these new frequency data, as was explained referring to FIG. 5, it is possible to obtain a frequency envelope in which the pitch of the sound has been changed.

Figure 7:
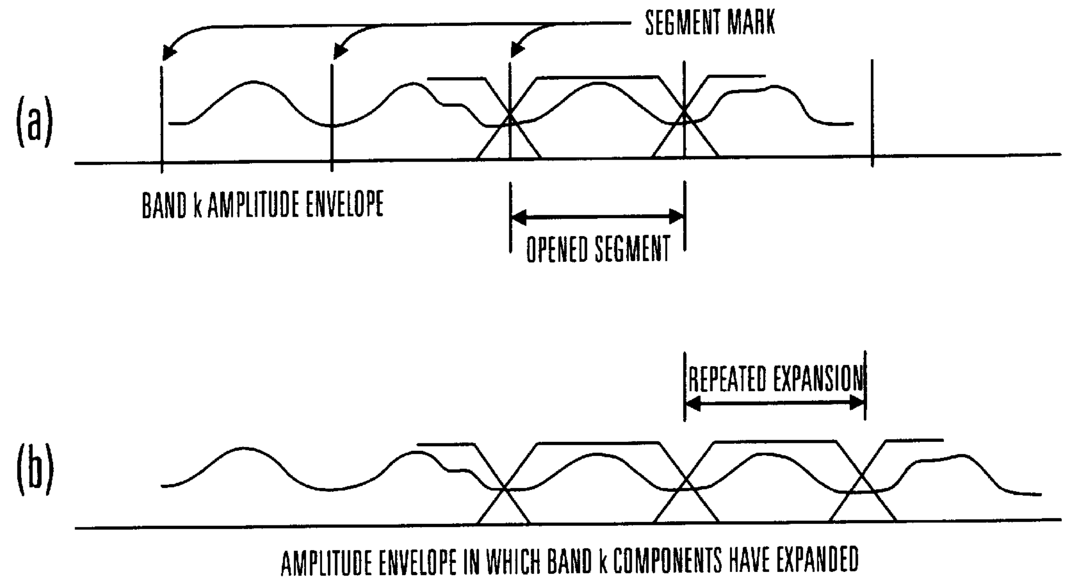
FIG. 7 is a diagram that shows the segment mark that has been established for the adjustment of the temporal change rate for the amplitude in band k.

FIG. 7 is a diagram that shows the segment mark that has been established for the adjustment of the temporal change rate for the amplitude in band k. Segment marks may be established at zero-crossings of the amplitude data, and define portions of the waveform to be duplicated and added or omitted.

In order to append the segment marks for the adjustment of the temporal change rate of the amplitude to the amplitude envelope in band k, each of the points at which each segment mark is to be appended is calculated in advance based on the amplitude data that have been stored in the RAM 70 and the data that indicate each point are stored in the RAM 70 together with the amplitude data. Having done this, afterward at the time that the temporal change rate of the amplitude in band k is adjusted, those data are read out and, as is shown in FIG. 7(*a*), the waveform in the segment that has been opened is omitted and the amplitude envelope of band k is compressed or, as is shown in FIG. 7(*b*), the waveform in the segment that has been opened is duplicated and added and the amplitude envelope of band k is expanded. In this preferred embodiment, the amplitude data for the amount of one integer period or more of the periodic change of the amplitude that is expressed by the amplitude data are duplicated or omitted but there are cases where it is not a completely repeated waveform and the waveforms in the duplicated or omitted portions do not connect well. Therefore, in FIG. 7(*a*) and FIG. 7(*b*), a smooth amplitude envelope is obtained by the cross-fade processing of the mutually adjacent portions after the omission or addition of the opened segments has been carried out.

Next, an explanation will be given regarding a method with which a smooth amplitude envelope is obtained that can be employed instead of the cross-fade processing.

Figure 8:
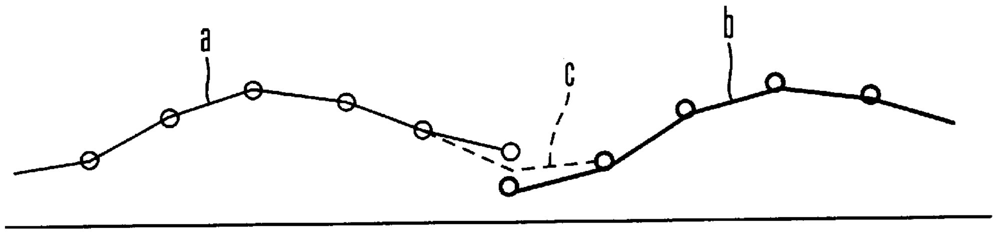
FIG. 8 is a diagram that shows the aspect in which a smooth amplitude envelope is obtained by the interpolation of the mutually adjoining portions of segments after the omission or addition of the opened segment has been carried out.

FIG. 8 is a diagram that shows the aspect in which a smooth amplitude envelope is obtained by the interpolation of the mutually adjoining portions of segments after the omission or addition of the opened segment has been carried out.

In FIG. 8, the segment a and the segment b after the omission or addition of the opened segment has been carried out are shown. The mutually adjacent portions of the segment a and the segment b may be interpolated by an interpolation means (not shown in the diagram) and connected as with the broken line c obtaining a smooth amplitude envelope.

The amplitude data, the frequency data and the phase data that express the temporal changes of the amplitudes and frequencies after the temporal change rates have been adjusted for each frequency band in the above manner are input to the combining section 230 from the conversion section 220 that is shown in FIG. 2. In addition, the phase reset signals from a circuit section that is not shown in the drawing of the DSP 20 are input to the combining section 230. The combining section 230, as is shown in FIG. 2, comprises the cosine signal generator 230_0 and modulator 231_0 pair, the cosine signal generator 230_1 and modulator 231_1 pair, . . . , the cosine signal generator 230_k and modulator 231_k pair, . . . and the cosine signal generator 230_p and modulator 23 1_p pair. The phase reset signals and the frequency data and phase data from the time and frequency conversion means 220_0, 220_1, . . . , 220$_{13}$ k, . . . , 220_p are respectively input to the cosine signal generators 230_0, 230_1, . . . , 230_k, . . . , 230_p. These cosine signal generators 230_0, 230_1, . . . , 230_k, . . . , 230_p reset the phases that are being maintained when the phase reset signals are input, acquire the phase data from the time and frequency conversion means 220_0, 220_1, . . . , 220_k, . . . , 220_p and rewrite them with the value of the center frequency that has had the portion of the rotation ωkn added. Incidentally, the phase reset signals are input only once at the start of reproduction. In addition, the cosine signal generators 230_0, 230_1, . . . , 230_k, . . . , 230_p generate cosine waves in which the center frequency of each of the frequency bands has been changed temporally in accordance with the frequency envelopes that are expressed by each of the groups of frequency data. These cosine waves are input to each of the respective modulators 231_0, 231_1, . . . , 231_k, . . . , 231_p. In addition, each of the groups of amplitude data from each of the time and frequency conversion processing means 220_0, 220_1 220_ k, . . . , 220_p is input to each of the modulators 231_0, 231_1, . . . , 231_k, . . . , 231_p. Each of the modulators 231_0, 231_1, . . . , 231_k, . . . , 231_p amplitude modulates each of the cosine waves from each of the cosine signal generators 230_0, 230_1, . . . , 230_k, . . . , 230_p with the amplitudes that are expressed by each of the groups of amplitude data from each of the time and frequency conversion means 220_0, 220_1, . . . , 220_k, . . . , 220_p. In this manner, the waveforms in which the temporal changes of the frequency and amplitude of each band have been reproduced after the temporal change rates have been adjusted are reproduced. In addition, all of the these waveforms that have been reproduced are combined in the combining section 230. In this manner, the waveform y(n) in which the original waveform that has been input is compressed or expanded in the direction of the temporal axis. Incidentally, since, with the cosine signal generators 230_0, 230_1, . . . , 230_k, . . . 230_p, it is possible to acquire the phase data that correspond to the reproduction time, even in those cases where waveform reproduction is carried out in which waveforms that have been compressed or expanded in direction of the temporal axis or the waveform reproduction is carried out not from the beginning of original waveform but from the middle of the original waveform, it is possible to carry out the reproduction of a waveform that has a phase that is the same as the phase of the middle portion of the original waveform.

Since with the waveform reproduction apparatus 100 of the first preferred embodiment, the waveform y(n) is obtained by means of the processing as above, compared to a waveform reproduction apparatus that employs a cross-fade format with which the waveform data that express the original waveform are directly jump read or repetitively read out and cross-fade processed, such things as fluctuation and ripples due to a shift in the phase that is produced in the vicinity of the discontinuous areas are reduced.

In addition, with the waveform reproduction apparatus 100 of the first preferred embodiment, even in those cases where something such as one-to-one reproduction is carried out to reproduce the original sound, the time change rates of the frequency and the amplitude that are expressed by the phase data and the amplitude data are adjusted for each of the multiple number of frequency bands into which the original waveform has been divided so that neither compression nor expansion is carried out in the direction of the temporal axis. Accordingly, a waveform is reproduced that has the same phase as the phase of the waveform that expresses the original sound and, compared to the technology of the past with which a waveform is reproduced that has a phase that is different from the phase of the waveform that expresses the original sound, there are no problems such as a degradation of the tone quality or a loss of the orientation of the stereo signal and it is possible to obtain a waveform that has been compressed or expanded in the direction of the temporal axis which expresses such things as musical tones the sound quality of which is high.

Furthermore, since, with the waveform reproduction apparatus 100 of the first preferred embodiment, the temporal change rate of the amplitude is adjusted so that it is longer than that period while maintaining the period of the periodic change of the amplitude, even in those cases where, in a certain frequency band, the frequencies that express the multiple number of harmonics that are adjacent and are integer multiples of the fundamental frequency that corresponds to the fundamental period exist in multiple numbers, without compressing or expanding the fundamental period, it is possible to prevent the breakdown of the harmonic relationships of the original waveform. Accordingly, it is possible to improve the sound quality of musical tones etc. that are expressed by waveforms that have been compressed or expanded in the direction of the temporal axis.

Next, an explanation will be given regarding a waveform reproduction apparatus of the second preferred embodiment of the present invention. Since the block diagram that shows the circuit configuration of the waveform reproduction apparatus of the second preferred embodiment is the same as the block diagram that shows the circuit configuration of the waveform reproduction apparatus that is shown in FIG. 1 described previously, it will be omitted from the explanation.

Figure 9:
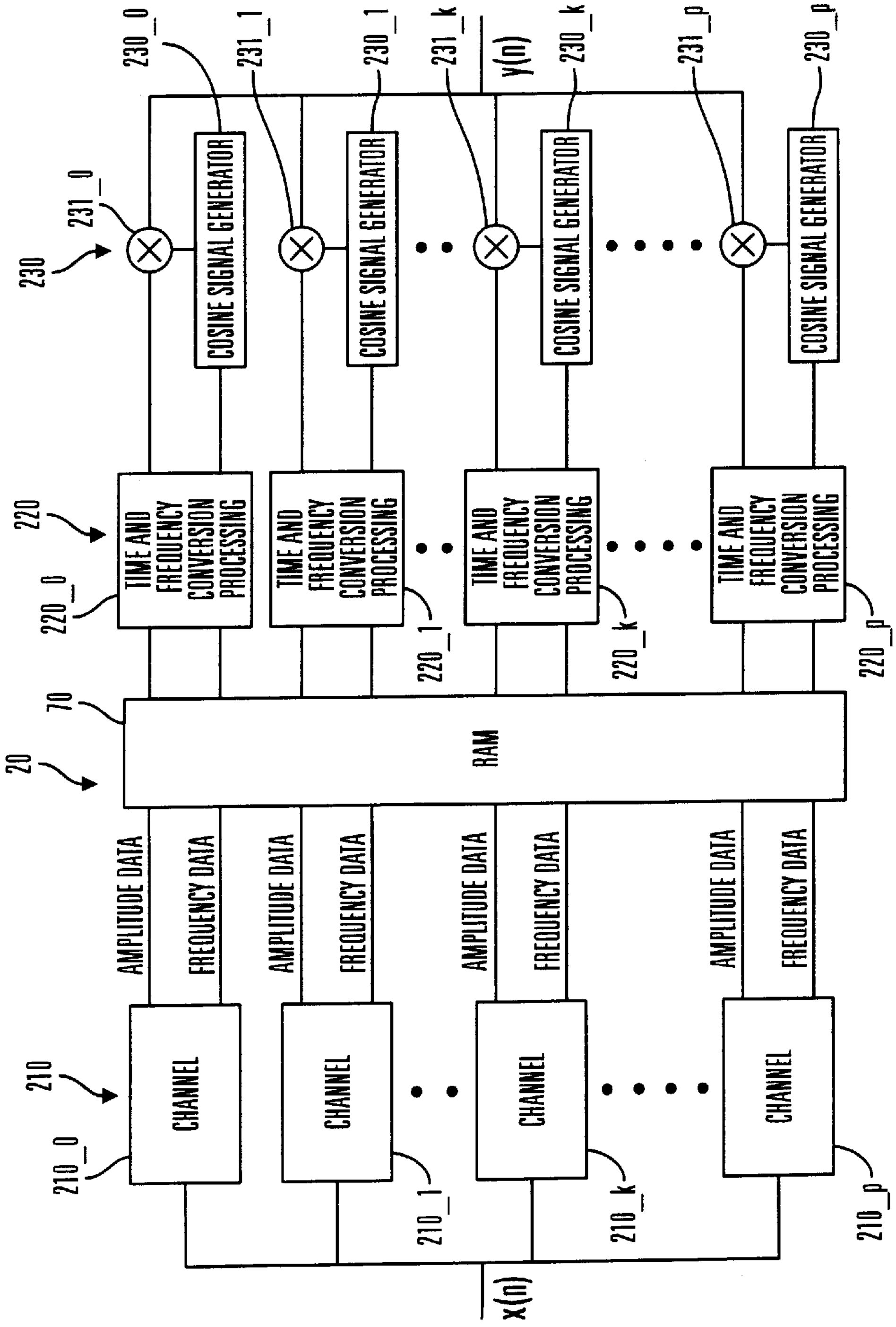
FIG. 9 is a block diagram in which the functions of the RAM and the DSP that are comprised by the waveform reproduction apparatus of the second preferred embodiment of the present invention have been shown as functional blocks and in which the blocks are shown classified by function.

FIG. 9 is a block diagram in which the functions of the RAM and the DSP that are comprised by the waveform reproduction apparatus of the second preferred embodiment of the present invention have been shown as functional blocks and in which the blocks are shown classified by function.

The DSP 20 that is shown in FIG. 9 comprises the analysis section 210, the conversion section 220 and the combining section 230. The expansion and compression switch that is comprised by the operator group of the waveform reproduction apparatus is operated and a desired expansion and compression rate is set. Then, the reproduction switch is pressed, the waveform reproduction is directed and the original waveform x(n) that expresses the original musical tone prior to carrying out compression or expansion is input to the analysis section 210. Here, n is a number that has been appended to each piece of data that expresses the instantaneous value of the original waveform which are input in order in time sequence. The analysis section 210 comprises the channels 210_0, 210_1, . . . , 210_k, . . . , 210_p. In the analysis section 210, the original waveform x(n) that has been input, as is shown in FIG. 15 that was discussed previously, is divided into a multiple number of frequency bands (band 0, 1, . . . , k, . . . , p) so that, in each band, the frequencies that express the multiple number of harmonics that are adjacent and are integer multiples of the fundamental frequency exist in multiple numbers. For each of the waveform components of the multiple number of frequency bands that have been divided, the frequency data and amplitude data that express the respective frequencies and amplitudes that have changed in order together with the passage of time are extracted and output to the RAM 70. A detailed explanation will be given below regarding the particulars of the analysis section 210 referring to FIG. 10.

Figure 10:
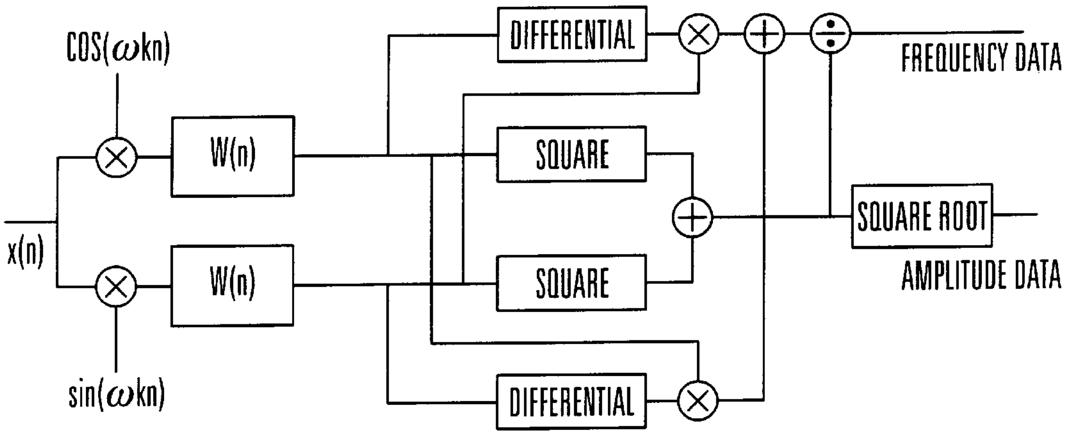
FIG. 10 is a diagram that shows the waveform processing in the first channel that comprises the analysis section that is shown in FIG. 9.

FIG. 10 is a diagram that shows the waveform processing in the first channel that comprises the analysis section that is shown in FIG. 9.

In FIG. 10, the aspect of the waveform processing in channel 210_k, which represents the multiple number of channels, is shown. In this channel 210_k, the nth data item (cos(ωkn, sin(ωkn)) of the center frequency ωk for the frequency band (band k) that corresponds to that channel 210_k is multiplied with the original waveform x(n) that has been input and converted into a real number portion and an imaginary number portion. Next, it is opened by the analysis window w that has a temporal width that corresponds to the impulse response time of an equivalent analog low-pass filter. Then, together with the phase differentiation and the extraction of the frequency data, the amplitude data are extracted by deriving the square root of the sum of the squares. This kind of calculation is repeated while the n of the nth data item (cos((ωkn, sin(ωkn)) of the center frequency ωk and the analysis window w(n) advance in order, that is to say, as they advance in order temporally. In this manner, the frequency data and amplitude data that express the respective frequencies and amplitudes that have changed in order together with the passage of time are extracted for each of the channels 210_0, 210_1, . . . , 210_k, . . . , 210_p that are comprised by the analysis section 210. The frequency data and the amplitude data that have been extracted are stored in the RAM 70 that is shown in FIG. 9.

The phase data and the amplitude data that have been stored in the RAM 70 are input to the conversion section 220. The conversion section, as is shown in FIG. 9, comprises the multiple number of time and frequency conversion processing means 220_0, 220_1, . . . , 220_k, . . . , 220_p. Each time and frequency conversion processing means 220_0, 220_1, . . . , 220_k, . . . , 220_p, for each frequency band, with regard to the amplitude, by means of a periodic operation in which the amplitude data for the amount of one integer period or more of the periodic change of the amplitude that is expressed by the amplitude data is duplicated and added or omitted, the temporal change rate of the amplitude is adjusted so that it is longer than that period while maintaining the period of the periodic change of the amplitude. In addition, with regard to the frequency also, the temporal change rate of the frequency is adjusted by means of repeating an operation in which the frequency data that correspond to the amplitude data that are duplicated and added or omitted are duplicated and added or omitted.

In order to make the adjustment with the time and frequency conversion processing means that is comprised by the conversion section 220 so that the temporal change rate of the amplitude in band k becomes slow, the amplitude data for the amount of one period of the periodic change of the amplitude that the amplitude data indicated by the thin line a express are duplicated and added as shown by the thick line a. In addition, with regard to the frequency, as is shown in FIG. 5 which was discussed previously, the frequency data that correspond to the amplitude data that have been duplicated and added are duplicated and added as shown by the thick line B. In this manner, together with the expansion of the amplitude envelope in band k, the frequency envelope is also expanded while maintaining the period of the periodic change of the amplitude. Incidentally, it is not limited to this and it may be done so that the amplitude data for the amount of two or more integer periods are duplicated and added or omitted and, with regard to the frequency also, together with the further expansion or compression of the amplitude envelope in band k, the frequency data that correspond to the amplitude data that are duplicated and added or omitted are duplicated and added or omitted and the frequency envelope in band k is further expanded or compressed.

Incidentally, in those cases where the pitch of the sound is changed, the frequency conversion processing that is shown below is carried out by the time and frequency conversion processing means prior to the adjustment of the temporal change rate of the frequency.

Figure 11:
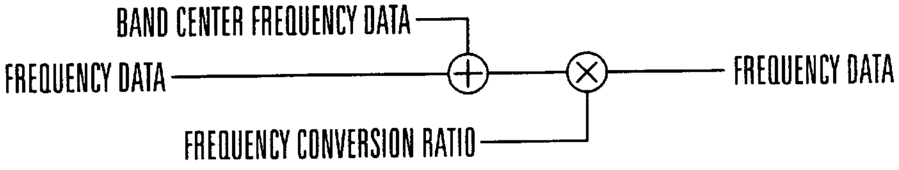
FIG. 11 is a diagram that shows the frequency conversion processing in order to change the sound pitch in the time and frequency conversion processing means that is shown in FIG. 9.
Figure 12:
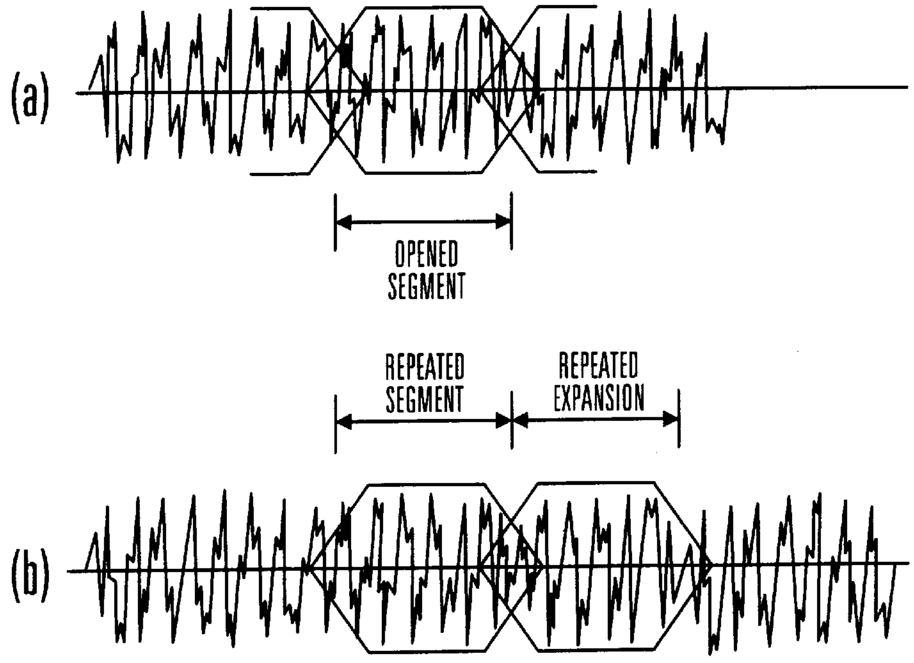
FIG. 12 is an explanatory diagram of the cross-fade format in which the waveform of the musical tone is compressed or expanded in the direction of the temporal axis.
Figure 13:
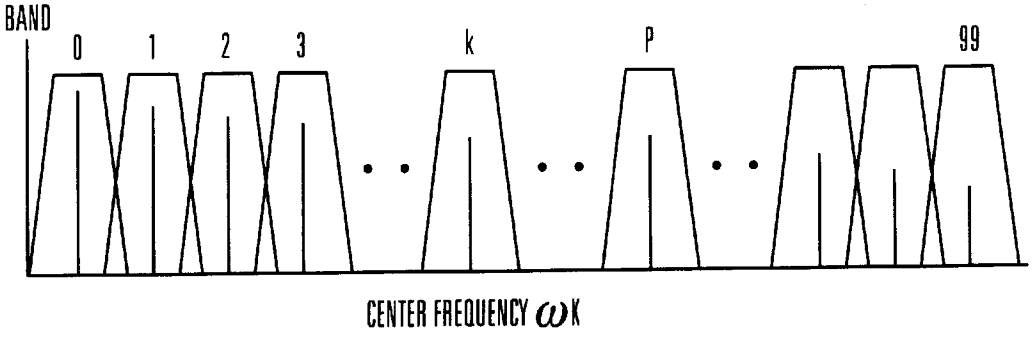
FIG. 13 is a diagram that shows the multiple number of frequency bands that have been divided by the phase vocoder.
Figure 14:
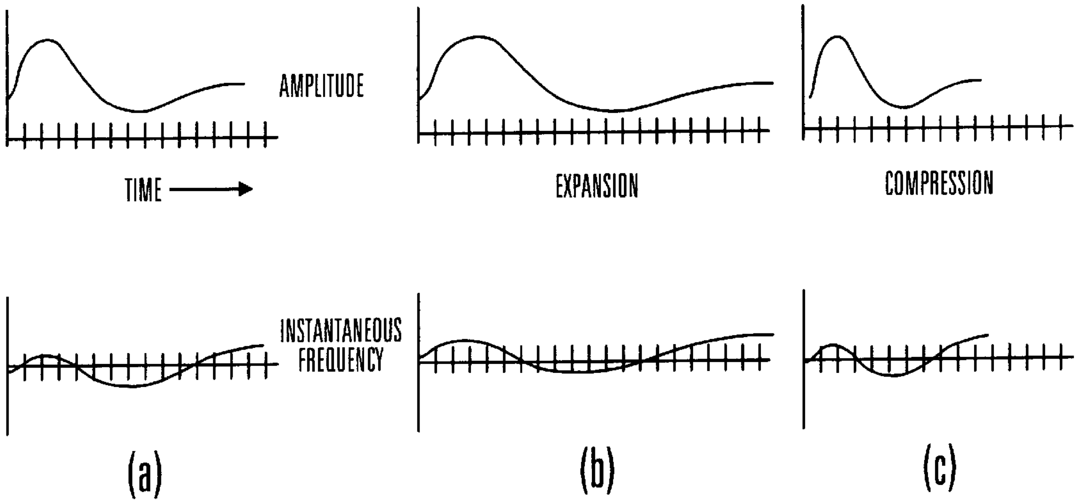
FIG. 14 is a schematic diagram that shows the aspect in which the temporal change rates of the frequency and the amplitude are adjusted by the phase vocoder.

FIG. 11 is a diagram that shows the frequency conversion processing in order to change the sound pitch in the time and frequency conversion processing means that is shown in FIG. 9.

In the time and frequency conversion processing means, the frequency data are input from the RAM 70. Since these frequency data are data that only vary in the frequency band that corresponds to that time and frequency conversion processing means, the frequency are added to the center frequency data of the band by the time and frequency conversion processing means and the frequency data that include the data for the center frequency of the band are obtained. Then these are multiplied by the frequency change ratio that has been established in advance and new frequency data are obtained. By means of the adjustment of the temporal change rate of the frequency based on these new frequency data, as was explained referring to FIG. 5, it is possible to obtain a frequency envelope in which the pitch of the sound has been changed.

The frequency data and the amplitude data that express the temporal changes of the amplitudes and frequencies after the temporal change rates have been adjusted for each frequency band in the above manner are input to the combining section 230 from the conversion section 220 that is shown in FIG. 9. The combining section 230, as is shown in FIG. 9, comprises the cosine signal generator 230_0 and modulator 231_0 pair, the cosine signal generator 230_1 and modulator 231_1 pair, . . . , the cosine signal generator 230_k and modulator 231_k pair, . . . and the cosine signal generator 230_p and modulator 231_p pair. Each of the groups of frequency data from the time and frequency conversion means 220_0, 220_1, . . . , 220_k, . . . , 220_p are respectively input to the cosine signal generators 230_0, 230_1, . . . , 230_k, . . . , 230_p. The cosine signal generators 230_0, 230_1, . . . , 230_k, . . . , 230_p generate cosine waves in which the center frequency of each of the frequency bands has been changed temporally in accordance with the frequency envelopes that are expressed by each of the groups of frequency data. These cosine waves are input to each of the respective modulators 231_0, 231_1, . . . , 231_k, . . . , 231_p. In addition, each of the groups of amplitude data from each of the time and frequency conversion processing means 220_0, 220_1, . . . , 220_k, . . . , 220_p is input to each of the modulators 231_0, 231_1, . . . , 231_k, . . . , 231_p. Each of the modulators 231_0, 231_1, . . . , 231_k, . . . , 231_p amplitude modulates each of the cosine waves from each of the cosine signal generators 230_0, 230_1, . . . , 230_k, . . . , 230_p with the amplitudes that are expressed by each of the groups of amplitude data from each of the time and frequency conversion means 220_0, 220_1, . . . , 220_k, . . . , 220_p. In this manner, the waveforms in which the temporal changes of the frequency and amplitude of each band have been reproduced after the temporal change rates have been adjusted are reproduced. In addition, all of these waveforms that have been reproduced are combined in the combining section 230. In this manner, the waveform y(n) in which the original waveform that has been input is compressed or expanded in the direction of the temporal axis.

Since with the waveform reproduction apparatus of the second preferred embodiment, the waveform y(n) is obtained by means of the processing as above, compared to a waveform reproduction apparatus that employs a cross-fade format with which the waveform data that express the original waveform are directly jump read or repetitively read out and cross-fade processed, such things as fluctuation and ripples due to a shift in the phase that is produced in the vicinity of the discontinuous areas are reduced. In addition, compared to the format that employs a waveform reproduction apparatus of the past known as a phase vocoder, the temporal change rate of the amplitude is adjusted so that it is longer than that period while maintaining the period of the periodic change of the amplitude, even in those cases where, in a certain frequency band, the frequencies that express the multiple number of harmonics that are adjacent and are integer multiples of the fundamental frequency that corresponds to the fundamental period exist in multiple numbers, without compressing or expanding the fundamental period, it is possible to prevent the breakdown of the harmonic relationships of the original waveform. Accordingly, it is possible to improve the sound quality of musical tones etc. that are expressed by waveforms that have been compressed or expanded in the direction of the temporal axis.

Incidentally, in the first and second preferred embodiments, an explanation was given with illustrations in which the operator groups comprised expansion and compression switches and reproduction switches. However, with the present invention, it is possible to have it comprise a keyboard and a modulation wheel and apply it also to a system in which the pitch and time are changed by the direction from the keyboard etc. of analysis parameters or the audio data of each band that have been analyzed and which include the production of musical tones in which the generation of sounds is instantaneous.

What is claimed is:

1. A waveform reproduction apparatus for generating a compressed or expanded waveform from original waveform data, the original waveform data being divided into a plurality of waveform components representing a plurality of frequency bands, the apparatus comprising:

a storage means for storing temporally changing phase data and amplitude data that represent phases and amplitudes of each waveform component;

a frequency data conversion means in communication with the storage means for converting the phase data into frequency data;

a change rate adjustment means in communication with the storage means and the frequency data conversion means for adjusting temporal change rates of the frequency data and amplitude data; and a waveform reproduction means in communication with the storage means and the change rate adjustment means for generating output waveform data which is a temporally compressed or expanded version of the original waveform data by reproducing the stored frequency data and amplitude data in accordance with the adjusted temporal change rates of the frequency data and amplitude data.

2. A waveform reproduction apparatus as recited in claim 1, wherein the change rate adjustment means adjusts the temporal change rate for the amplitude data by duplicating the amplitude data for an amount equal to at least one integer period of the amplitude data and adding or omitting the duplicated amplitude data to the amplitude data.

3. A waveform reproduction apparatus as recited in claim 2, wherein the change rate adjustment means adjusts the temporal change rate for the frequency data by duplicating the phase or frequency data that corresponds to the added or omitted amplitude data for an amount equal to at least one integer period of the phase or frequency data, and adding or omitting the duplicated phase or frequency data to the phase or frequency data.

4. A waveform reproduction apparatus for generating a compressed or expanded waveform from original waveform data, the original waveform data being divided into a plurality of waveform components representing a plurality of frequency bands, the apparatus comprising:

a storage means for storing temporally changing frequency data and amplitude data that represent frequencies and amplitudes of each waveform component;

a change rate adjustment means in communication with the storage means for adjusting temporal change rates of the frequency data and amplitude data; and a waveform reproduction means in communication with the storage means and the change rate adjustment means for generating output waveform data which is a temporally compressed or expanded version of the original waveform data by reproducing the stored frequency data and amplitude data in accordance with the adjusted temporal change rates of the frequency data and amplitude data;

wherein the change rate adjustment means adjusts the temporal change rate for the amplitude data by duplicating the amplitude data for an amount equal to at least one integer period of the amplitude data, and adding or omitting the duplicated amplitude data to the amplitude data.

5. A waveform reproduction apparatus as recited in claim 4, wherein the change rate adjustment means adjusts the temporal change rate for the frequency data by duplicating the frequency data that corresponds to the added or omitted amplitude data, and adding or omitting the duplicated frequency data to the frequency data.

6. A method for generating a compressed or expanded waveform from original waveform data, the method comprising the steps of:

generating a plurality of frequency band-divided waveform data from the original waveform data;

extracting phase and amplitude data having periodically changing amplitudes for each of the plurality of frequency band-divided waveform data;

converting the periodically changing phase data to periodically changing frequency data and adjusting a temporal change rate of the periodically changing amplitude and frequency data for each of the plurality of frequency band-divided waveform data;

reproducing the amplitude and frequency data in accordance with the adjusted temporal change rates of the amplitude and frequency data for each of the plurality of frequency band-divided waveform data; and combining the reproduced amplitude and frequency data for each of the plurality of frequency band-divided waveform data to generate the compressed or expanded waveform.

7. A method as recited in claim 6, the step of generating a plurality of frequency band-divided waveform data comprising dividing the original waveform data into a plurality of frequency band-divided waveform data so that each frequency band contains a center frequency and a plurality of harmonics that are integer multiples of the center frequency.

8. A method as recited in claim 7, the steps of dividing the original waveform data into a plurality of frequency band-divided waveform data and extracting phase and amplitude data having periodically changing amplitudes comprising the steps of:

for each of the plurality of frequency band-divided waveform data, and for each of a plurality of N instantaneous values of the original waveform data and a corresponding Nth data item of the center frequency received in time sequence within each of the plurality of frequency band-divided waveform data, multiplying the Nth data item of the center frequency within a particular frequency band-divided waveform data by the Nth instantaneous value of the original waveform data to produce an intermediate result, convolving the intermediate result by an analysis window having a temporal width corresponding to an impulse response time of a low-pass filter to produce X cos and X sin, computing the phase data as arctan(X sin/X cos) when X cos>0 or computing the phase data as arctan(X sin/X cos)+π when X cos<0, and computing the amplitude data as a square root of a sum of squares of X cos and X sin.

9. A method as recited in claim 6, the step of adjusting a temporal change rate of the periodically changing amplitude and frequency data for each of the plurality of frequency band-divided waveform data comprising the steps of:

duplicating a portion of the amplitude data for an amount equal to at least one integer period of the amplitude data, and adding or omitting the duplicated amplitude data to the amplitude data; and duplicating a portion of the frequency data for an amount equal to at least one integer period of the periodically changing frequency data, and adding or omitting the duplicated frequency data to the frequency data.

10. A method as recited in claim 6, the steps of reproducing the amplitude and frequency data and combining the reproduced amplitude and frequency data for each of the plurality of frequency band-divided waveform data comprising the steps of:

for each of the plurality of frequency band-divided waveform data, resetting phases of the phase and frequency data extracted from the frequency band-divided waveform data, generating cosine waves in which a center frequency of the frequency band-divided waveform data has been changed temporally in accordance with the periodically changing amplitude of the frequency data, and amplitude modulating the cosine waves with the amplitude data; and combining the amplitude modulated cosine waves generated from the plurality of frequency band-divided waveform data.

11. A method as recited in claim 6, the step of adjusting a temporal change rate of the periodically changing amplitude and frequency data for each of the plurality of frequency band-divided waveform data, comprising the steps of:

for each of the plurality of frequency band-divided waveform data, appending segment marks to the amplitude data that define segments of amplitude data, and duplicating a portion of the amplitude data beginning at a segment mark for an amount equal to at least one integer period of the periodically changing amplitude data, and adding or omitting the duplicated amplitude data to the amplitude data.

12. A method as recited in claim 11, further including the step of cross-fade processing to obtain a smooth temporal change rate of the amplitude data.

13. A method as recited in claim 11, further including the step of interpolation mutually adjoining portions of segments of the amplitude data after adding or omitting the duplicated amplitude data to obtain a smooth temporal change rate of the amplitude data.

14. A method for generating a compressed or expanded waveform from original waveform data, the method comprising the steps of:

generating a plurality of frequency band-divided waveform data from the original waveform data;

extracting frequency and amplitude data having periodically changing amplitudes for each of the plurality of frequency band-divided waveform data;

adjusting a temporal change rate of the periodically changing amplitude and frequency data for each of the plurality of frequency band-divided waveform data;

reproducing the amplitude and frequency data in accordance with the adjusted temporal change rates of the amplitude and frequency data for each of the plurality of frequency band-divided waveform data; and combining the reproduced amplitude and frequency data for each of the plurality of frequency band-divided waveform data to generate the compressed or expanded waveform.

15. A method as recited in claim 14, the step of generating a plurality of frequency band-divided waveform data comprising dividing the original waveform data into a plurality of frequency band-divided waveform data so that each frequency band contains a center frequency and a plurality of harmonics that are integer multiples of the center frequency.

16. A method as recited in claim 15, the steps of dividing the original waveform data into a plurality of frequency band-divided waveform data and extracting frequency and amplitude data having periodically changing amplitudes comprising the steps of:

for each of the plurality of frequency band-divided waveform data, and for each of a plurality of N instantaneous values of the original waveform data and a corresponding Nth data item of the center frequency received in time sequence within each of the plurality of frequency band-divided waveform data, multiplying the Nth data item of the center frequency within a particular frequency band-divided waveform data by the Nth instantaneous value of the original waveform data to produce an intermediate result, convolving the intermediate result by an analysis window having a temporal width corresponding to an impulse response time of a low-pass filter to produce X cos and X sin, computing the frequency data by phase differentiating X cos and X sin, and computing the amplitude data as a square root of a sum of squares of X cos and X sin.

17. A method as recited in claim 14, the step of adjusting a temporal change rate of the periodically changing amplitude and frequency data for each of the plurality of frequency band-divided waveform data comprising the steps of:

duplicating a portion of the amplitude data for an amount equal to at least one integer period of the amplitude data, and adding or omitting the duplicated amplitude data to the amplitude data; and duplicating a portion of the frequency data for an amount equal to at least one integer period of the periodically changing frequency data, and adding or omitting the duplicated frequency data to the frequency data.

18. A method as recited in claim 14, the steps of reproducing the amplitude and frequency data and combining the reproduced amplitude and frequency data for the plurality of frequency band-divided waveform data comprising the steps of:

for each of the plurality of frequency band-divided waveform data, generating cosine waves in which a center frequency of the frequency band-divided waveform data has been changed temporally in accordance with the periodically changing amplitude of the frequency data, and amplitude modulating the cosine waves with the amplitude data; and combining the amplitude modulated cosine waves generated from the plurality of frequency band-divided waveform data.

19. A method as recited in claim 14, further including the step of:

for each of the plurality of frequency band-divided waveform data, changing pitch by adding the frequency data to center frequency data to produce intermediate frequency data, multiplying the intermediate frequency data by a frequency change ratio to produce new frequency data, and duplicating a portion of the new frequency data for an amount equal to at least one integer period of the new frequency data, and adding or omitting the duplicated new frequency data to the new frequency data.

* * * * *